United States Patent [19]

Westfall

[11] 4,237,810
[45] Dec. 9, 1980

[54] HYDRODYNAMICALLY AND AERODYNAMICALLY DESIGNED BOAT

[76] Inventor: Kirk M. Westfall, 1139 White Dr., Santa Clara, Calif. 95051

[21] Appl. No.: 966,663

[22] Filed: Dec. 5, 1978

[51] Int. Cl.³ .............................................. B63B 1/16
[52] U.S. Cl. .................................... 114/272; 114/288
[58] Field of Search ............................... 114/271–291; 9/6 P, 6 R

[56] References Cited

U.S. PATENT DOCUMENTS

| 1,063,805 | 6/1913 | Krause | 114/272 |
|---|---|---|---|
| 2,081,868 | 5/1937 | Hampden | 114/274 |
| 2,914,014 | 11/1959 | Carl et al. | 114/281 |
| 3,094,962 | 6/1963 | Goar | 114/271 |
| 3,157,146 | 11/1964 | Billig | 114/283 |
| 3,223,066 | 12/1965 | Irving | 114/273 |
| 3,477,400 | 11/1969 | Walker | 114/274 |
| 3,648,640 | 3/1972 | Granger | 114/273 |

Primary Examiner—Trygve M. Blix
Assistant Examiner—Jesús D. Sotelo
Attorney, Agent, or Firm—Phillips, Moore, Weissenberger, Lempio & Majestic

[57] ABSTRACT

A motor driven hydroplaning boat has a hull of symmetrical generally smooth surfaced configuration which converges towards an apex at a bow thereof and widens amidships to form a pair of laterally and downwardly extending wings. A forward bottom portion of the hull, from the bow to beneath the wings, forms a generally smooth surfaced concave downward tunnel. The wings smoothly narrow aft of amidships and become generally horizontal from amidships aft. A top of the hull is of a generally smooth minimal air resistance shape. A fore foil structure is mounted to extend downwardly from the fore tunnel. An aft foil structure is mounted to extend downwardly from an aft bottom portion of the hull. The overall boat has low air resistance yet overall high stability and can be turned relatively sharply.

14 Claims, 5 Drawing Figures

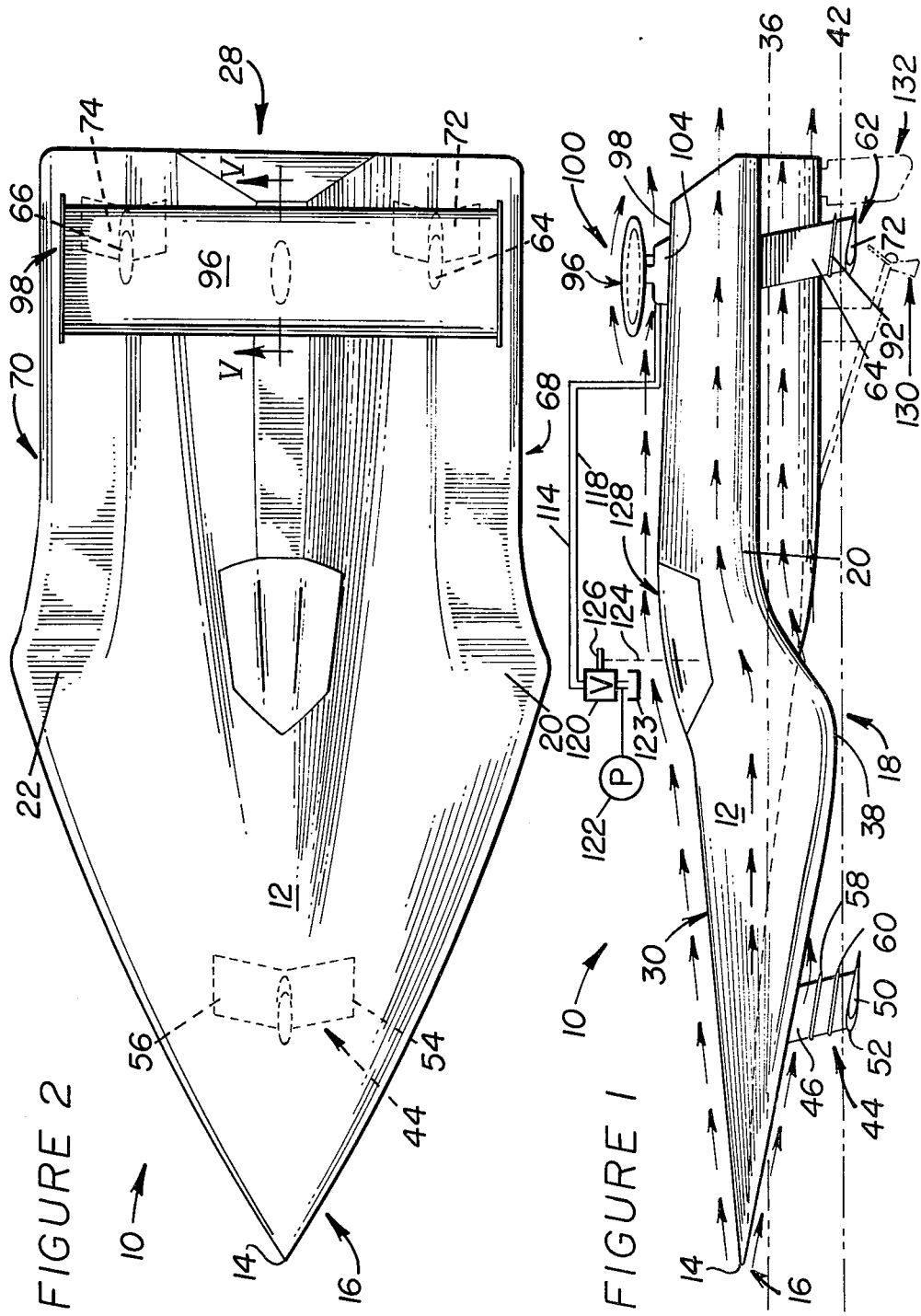

HYDRODYNAMICALLY AND AERODYNAMICALLY DESIGNED BOAT

BACKGROUND OF THE INVENTION

1. Field of the Invention

The invention relates to motor driven boats which hydroplane upon hydrofoils.

2. Prior Art

Boats which travel in bodies of water by hydroplaning upon the water are well known. Basically, there are two such types of boats, namely those which hydroplane upon the body of the boat itself and those which hydroplane upon foils (hydrofoils) which extends below the body of the boat. In this latter instance, the body of the boat is lifted generally above the surface of the water. Very high speeds are attainable since water drag is greatly reduced. A number of hydroplaning boats are known to the prior art. For example, the following listed patents disclose such structures: U.S. Pat. No. 1,901,357 to Raulerson, et al; U.S. Pat. Nos. 2,257,405 and 2,257,406 to H. F. S. Von Burtenbach; U.S. Pat. No. 2,422,818 to J. G. Bamberger; U.S. Pat. No. 2,909,140 to E. C. Kiekhaefer; U.S. Pat. No. 3,477,400 to H. Walker and U.S. Pat. No. 3,648,640 to R. A. Granger.

It is known to the prior art, for example as shown in the aforementioned Raulerson patent, to utilize a stabilizer bar with a planing boat. It is further known, for example as shown in the aforemention Von Burtenbach patent, to use forward and rearward foils to obtain lift. Use of concave boat hulls is shown in the aforementioned Bamberger and Kiekhaefer patents.

With all of the knowledge now available relating to hydroplaning boats, however, no single hydroplaning boat structure has been previously designed which will provide significant air pressure lift, be extremely stable both when going straight and when turning, be particularly sharply turnable and which will have relatively low air resistance to allow high speed operation thereof. It is clear that a single solution to the problems of air resistance, stability and turning would be highly desirable in a hydroplaning boat and would lead to significant energy and/or time savings in the operation thereof.

SUMMARY OF THE INVENTION

The present invention is directed to a motor driven hydroplaning boat. The boat comprises a hull of symmetrical generally smooth surfaced configuration converging towards an apex at a bow thereof and widening amidships to form a pair of laterally and downwardly extending wings or sponsons, a forward bottom portion of the hull from the bow to beneath the wings forming a generally smooth surfaced tunnel, the wings smoothly narrowing aft of amidships and becoming generally horizontal from amidships aft, a top of the hull being of a generally smooth minimal air resistance shape. The boat further comprises a fore foil structure mounted to extend downwardly from the fore tunnel and an aft foil structure mounted to extend downwardly from an aft bottom portion of the hull.

With a motor driven boat designed in accordance with the various aspects of the present invention, minimum air resistance is achieved along with maximum lift, while stability of operation is retained. Further, turning is significantly aided. What results in an overall steady motion of the boat with a steady lift. Because of the low air resistance relatively little energy is utilized by the boat and it can go at a very fast speed.

BRIEF DESCRIPTION OF THE DRAWINGS

Adverting to the figures of the drawings wherein like numbers denote like parts throughout:

FIG. 1 illustrates in side elevation, partially schematically, a boat in accordance with the present invention;

FIG. 2 illustrates a top view of the boat shown in FIG. 1;

DETAILED DESCRIPTION OF THE PREFERRED EMBODIMENT

Figure 5:
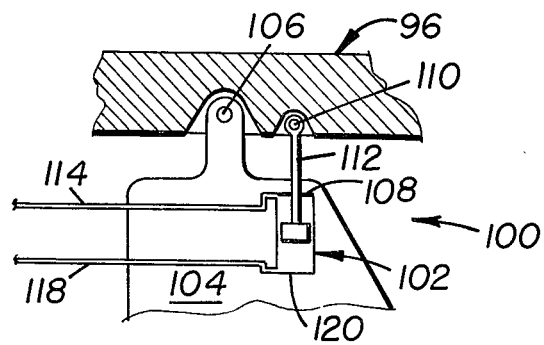
FIG. 5 illustrates a partial sectional view taken along plane V—V of FIG. 2.

Adverting primarily to FIGS. 1 and 2, there is illustrated therein a motor driven hydroplaning boat 10 of an advanced hydrodynamic and aerodynamic design. The boat 10 includes a hull 12 of a symmetrical generally smooth surfaced configuration. The hull 12 converges towards an apex 14 at a bow 16 thereof. The hull 12 widens amidships 18 to form a pair of laterally and downwardly extending wings 20 and 22. A forward bottom portion 24 (see FIG. 3) of the hull 12, from the bow 16 to beneath the beginning of the wings 20 and 22, forms a concave downward fore tunnel 26. The wings 20 and 22 smoothly narrow aft of midships 18 towards a stern 28 of the hull 12. This narrowing can be most clearly seen in FIGS. 1 and 2 from which it will be apparent that the wings 20 and 22 relatively quickly narrow and raise up to the horizontal and then continue backwardly from just aft of amidships 18 without further narrowing to the stern 28.

As will be most apparent from FIG. 1, a top 30 of the hull 12 is of a generally smooth minimal air resistance (streamline) shape whereby air can flow thereover as is seen by the arrows in FIG. 1. Further, the bottom portion 24 of the hull 12 from the bow 16 to beneath the wings 20 and 22 is likewise relatively smooth to allow smooth low air resistance (streamline) air flow thereunderneath. An aft bottom portion 32 of the hull 12 is also smooth surfaced to promote low air resistance streamline flow. By observation of the arrows in FIG. 1 it will be seen that a smooth air flow occurs over the top 30 of the hull 12 as well as along the entire bottom thereof. The smooth flow across the top 30 of the hull 12 provides a stabilizing influence as well as assuring very low air resistance. The smooth flow beneath the hull 12 provides an air lift force acting upwardly on the hull 12.

Figure 3:
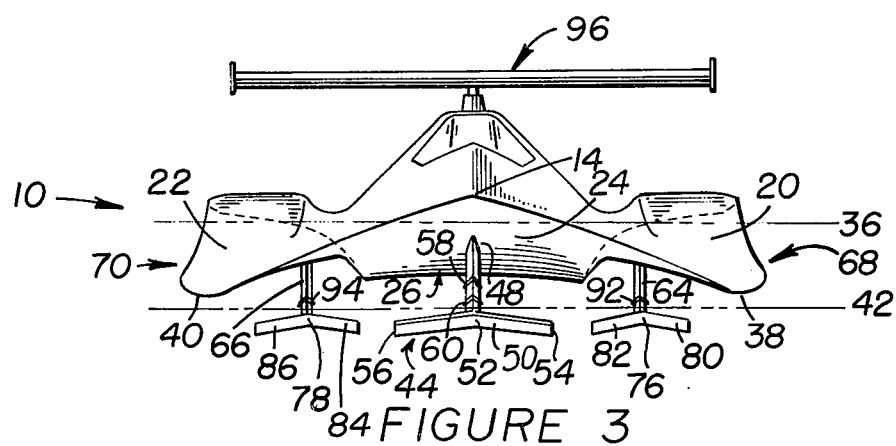
FIG. 3 illustrates a front view of the boat shown in FIG. 1.
Figure 4:
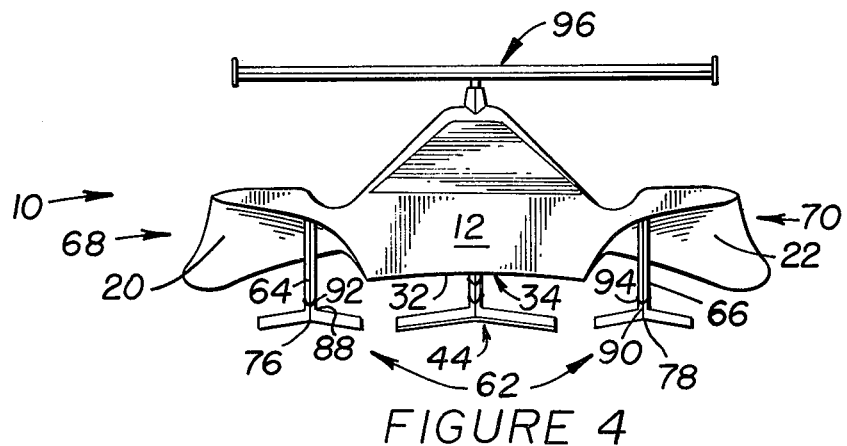
FIG. 4 illustrates a back view of the boat shown in FIG. 1.

The aft bottom portion 32 of the hull 12 generally forms a concave downward aft tunnel 34 as seen in FIG. 4. Basically, the fore tunnel 26 communicates with the aft tunnel 34 via a smooth tapering thereinto so that air flow proceeds from the bow 16 of the hull 12 through the fore tunnel 26 and thence through the aft tunnel 34. As will be seen in FIGS. 3 and 4, the aft tunnel 34 has a radius of curvature which is larger than that of the fore tunnel 26 and the aft tunnel 34 extends a lesser distance from larboard to starboard than does the fore tunnel 26 thus providing an overall inward funneling effect from the bow 16 to the stern 28. The relatively flat aft tunnel 34 provides good planing action on start up and good air lift action at high speeds.

Adverting primarily to FIGS. 1 and 3, it will be noted that the wings 20 and 22 of the hull 12 will normally sit below a non-planing water line 36 when the boat 10 is not moving or is not planing, but that the wings 20 and 22 (see phantom lines in FIG. 3) will have lowermost tips 38 and 40 thereof above a surface (planing water line) 42 of the water upon which the boat is moving during hydroplaning motion. Thus, it is seen that the wings 20 and 22 extend downwardly a distance such that when the boat 10 is hydroplaning forwardly the lowermost tips 38 and 40 of the wings 20 and 22 are substantially an equal distance above the planing water line 42, for example, about 35 to 30 cm above the planing water line.

A fore foil structure 44 is mounted to extend downwardly from the fore tunnel 26. The preferred fore foil structure 44 includes a vertical streamlined low air resistance shaped (teardrop shaped in cross-section) fore post 46 which extends downwardly from a central portion 48 of the fore tunnel 26 and a generally V-shaped fore foil 50 mounted at an apex 52 thereof with the apex 52 pointing towards the bow 16 and with a pair of legs 54 and 56 extending down and aft of the apex 52. This structure is best seen in FIGS. 2 and 3.

By reference to FIGS. 1 and 3 it will be seen that the fore foil structure 44 may also include at least one ridge 58 and more preferably a pair of ridges 58 and 60 which circle and extend outwardly from the fore post 46 intermediate the fore tunnel 26 and the generally V-shaped fore foil 44. The ridges 58 and 60 are normally placed in spaced apart relation from one another. The ridges 58 and 60 serve as supplemental support foils which are particularly useful in lifting the boat from a non-hydroplaning position thereof and are also useful in keeping the bow 16 of the boat 10 from pitching forwardly and downwardly. On startup, as the bow 16 begins to lift as the boat 10 gathers speed, the upper ridge 58 will provide additional lift by acting as a small foil until it comes above the water line. The ridge 60 will come above the water line later and will serve for a longer time as a small foil for aiding in the next step of lifting of the bow 16. Then, the fore foil structure 44 will take over the lifting function and the bow 16 will assume its normal hydroplaning position. If the bow 16 starts to dive forwardly and downwardly, the ridges 60 and 58 (in that order) sequentially enter the water to provide lift to stop the diving.

An aft foil structure 62 is mounted to extend downwardly from the aft bottom portion 32 of the hull 12. The preferred aft foil structure 62 includes a pair of symmetrically positioned vertical streamlined low air resistance shaped (teardrop shaped in cross-section) aft posts 64 and 66, one of which 64 is shown in FIG. 1 and both of which are shown in FIGS. 2, 3 and 4. The aft post 64 extends downwardly from a larboard side 68 of the aft bottom portion 32 of the hull 12 while the aft post 66 extends downwardly from a starboard side 70 of the aft bottom portion 32 of the hull 12, more particularly from the undersides of the wings 20 and 22. A pair of generally V-shaped aft foils 72,74 are each mounted at a respective apex 76,78 thereof with the apexes 76 and 78 pointing towards the bow 16 of the hull 12 and with respective pairs of legs 80,82 and 84,86 thereof extending down and aft. The V-shaped aft foil 72 is thus mounted to a bottom 88 of the larboard aft post 64 while the V-shaped aft foil 74 is mounted to a bottom 90 of the starboard aft post 66.

The aft posts 64 and 66 may preferably each have at least one ridge 92,94 circling and extending outwardly from it intermediate the aft bottom portion 32 of the hull 12 and the respective generally V-shaped aft foil 64,66. The ridges 92 and 94 serve a similar purpose adjacent the stern 28 of the hull 12 as do the ridges 58 and 60 on the fore post 46. Thus, both initial lift and stability are provided by the ridges 92 and 94.

It is highly preferable to provide a low air resistance streamlined stabilizer airfoil 96 mounted to extend laterally relative to the hull 12 above an aft top portion 98 thereof. When air is flowing past the hull 12 in the manner shown in FIG. 1, it will be noted that it separates going over the top and under the bottom surfaces of the stabilizer bar 96. This provides added stability to the boat 10 as it travels through the water at high speeds in a hydroplaning mode of operation and allows the relative lifts at the bow 16 and stern 28 to be varied. The stabilizer bar 96 can be a classical lifting airfoil or can simply be teardrop shaped in cross-section.

Adverting particularly to FIG. 1 and 5, it will be noted that means 100 is provided for selectively varying an angle between the hull 12 and the stabilizer bar 96. Referring particularly to FIG. 5 it will be seen that a hydraulic or pneumatic cylinder 102 may be placed within or adjacent an upward extending post 104, which post 104 extends upwardly from the aft top portion 98 of the hull 12. The post 104 is pivotally attached as at a pin 106 to the stabilizer bar 96. A rod end 108 of the cylinder 102 is pivotally attached at a pin 110 to the stabilizer bar 96 at a position removed from the pin 106. Thus, as a rod 112 of the cylinder 102 moves upwardly or downwardly, the stabilizer bar 96 will be tilted.

The cylinder 102 is controlled in a conventional manner. A first line 114 goes to the rod end 108 of the cylinder 102 while a second line 118 goes to a head end 120 of the cylinder 102. Referring now to FIG. 1, it will be seen that the lines 114 and 118 go to a conventional selective flow reversing valve 120 which can selectively deliver flow as from a pump or other pressure means 122 to either line 114 or 118, while connecting the other of line 114 or 118 for bleeding off of pressure, for example to a sump 123 if the system is hydraulic. Thus, the cylinder 102 would normally be of the double-acting variety.

As illustrated in FIG. 1 by a dashed line 124, a control member 126 of the control valve 120 would normally be located within a cockpit 128 of the boat 10 whereby the operator of the boat can selectively vary the angle between the hull 12 and the stabilizer bar 96. The result of the aforementioned variation in angle is that the stern 28 of the boat 10 will be pushed either downwardly or upwardly relative to the bow 16 thereof at the option of the operator in the cockpit 128. Control of the angles of attack on the water of the fore foil 50 and the aft foils 72,74 is normally provided in a conventional manner within the cockpit 128.

Operation

In operation, the boat 10 will begin moving under the impetus of its (internal) motor (although outboard motors can also be used) and a conventional screw 130 which is shown only in FIG. 1 (in phantom) for clarity. The boat will be steerable via use of a conventional rudder 132 which is also shown only in FIG. 1 (in phantom) for clarity. As the boat begins to pick up speed it will begin to lift above the water line as seen in FIGS. 1 and 3 due to water pressure pushing upwardly upon the fore tunnel 26. The ridges 58 and 60 will begin to serve a planing purpose and to lift the bow 16. Meanwhile, the stern 28 will be lifted by pressure upon the aft bottom portion 32 of the hull 16 and by action of the ridges 92,94 acting as a foil. As further speed is attained both the bow 16 and the stern 28 will be further lifted, respectively, by the fore foil 50 and by the pair of aft foils 72 and 74. The water will then be at the position indicated by the line 42. In this position, air will flow under the boat through the fore tunnel 26 and thence through the aft tunnel 34 and out past the stern 28. It will be noted that the wings 20 and 22 will provide stabilization against rolling during hydroplaning operation. Air flowing over the top 30 of the hull 12 will partially flow atop the wings 20 and 22 and partially flow atop the aft top portion 98 of the hull 12. That portion of the air which flows over the aft top portion 98 of the hull 12 will partially separate at the stabilizer bar 96, flowing partially thereover and partially thereunder. This provides a significant stabilizing function.

In turning, the wings 20 and 22 serve a useful function. In particular, on turning for example to larboard, the larboard side wing 20 will dip partially to contact the water surface whereby the wing 20 will serve as a hydrofoil thus increasing frictional resistance significantly on the larboard side 68 of the boat but doing so in a relatively smooth and controlled manner. Hence, relatively smooth but sharp turning can be accomplished.

Also in operation, the fore tunnel 26 provides a shock absorbing effect as the boat goes at high speed to ease the ride of an operator within the cockpit 128. The particular arrangement of a fore tunnel 26 having a smaller radius of curvature than an aft tunnel 34 and the aft tunnel 34 extending a lesser distance from larboard to starboard than does the fore tunnel 26 to form a bow 16-to-stern 28 concave downward coverging tunnel leads to an extremely effecient shock absorbing action during hydroplaning operation. The ridges 58 and 60 provide a particular safety feature in that if the bow 16 of the boat 10 starts to nose dive forwardly, they will provide lift to stop such motion. Further, the ridges 58 and 60 splash water up underneath the boat to cause formation of significant bubbles whereby surface tension forces acting between the boat 10 and the water surface, particularly underneath the fore tunnel 26 and the aft tunnel 34, are effectively eliminated to provide a steady lift upon the boat 10. The ridges 58 and 60 also serve to lubricate the boat 10 beneath the fore tunnel 26 and the aft tunnel 34 thus significantly reducing the likelihood of hull deterioration thereat due to frictional drag forces.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A motor driven hydroplaning boat, comprising:
   a hull of symmetrical generally smooth surfaced configuration converging towards an apex at a bow thereof and widening amidships to form a pair of laterally and downwardly extending wings, a forward bottom portion of the hull from the bow to beneath the wings forming single generally smooth surfaced fore tunnel which extends generally entirely from larboard to starboard of said forward bottom portion, the wings smoothly narrowing aft of amidships and becoming generally horizontal from amidships aft, a top of said hull being of a generally smooth minimal air resistance shape;
   a fore foil structure mounted to extend downwardly from said fore tunnel; and
   an aft foil structure mounted to extend downwardly from an aft bottom portion of said hull.

2. A boat as in claim 1, wherein said aft bottom portion of said hull forms a single aft tunnel having a radius of curvature larger then that of said fore tunnel and wherein said aft tunnel extends a lesser distance from larboard to starboard then does said fore tunnel, said fore and aft tunnels joining to form a single bow-to-stern funnel.

3. A boat as in claim 1, including:
   a stabilizer bar mounted to extend laterally relative to said hull above an aft top portion thereof.

4. A boat as in claim 3, including:
   means for selectively varying an angle between said hull and said stabilizer bar.

5. A boat as in claim 1, wherein said fore foil structure includes a vertical low air resistance shaped fore post extending downwardly from a central portion of said fore tunnel and a generally V-shaped fore foil mounted, at an apex thereof with said apex pointing towards the bow and with a pair of legs thereof extending downwardly and aft, to a bottom of said fore post.

6. A boat as in claim 5, wherein said fore foil structure further has at least one ridge circling and extending outwardly from said fore post intermediate said fore tunnel and said generally V-shaped fore foil.

7. A boat as in claim 6, wherein there are a pair of said ridges in spaced apart relation from one another.

8. A boat as in claim 5, wherein said aft foil structure includes a pair of symmetrically position vertical low air resistance shaped aft posts, one extending downwardly from a larboard side and the other from a starboard side of said aft bottom portion, and a pair of generally V-shaped aft foils, each mounted at an apex thereof, with said apex pointing towards the bow and with a pair of legs thereof extending downwardly and aft, one mounted to a bottom of said one aft post and the other mounted to a bottom of said other aft post.

9. A boat as in claim 8, wherein said fore foil structure further has at least one ridge circling and extending outwardly from said fore post intermediate said fore tunnel and said generally V-shaped fore foil.

10. A boat as in claim 9, wherein each of said aft posts has at least one ridge circling and extending outwardly from it intermediate said aft bottom portion of said hull and said generally V-shaped aft foil.

11. A boat as in claim 10, wherein said aft bottom portion of said hull forms a single aft tunnel having a radius of curvature larger then that of said fore tunnel and wherein said aft tunnel extends a lesser distance from larboard to starboard then does said fore tunnel, said fore and aft tunnels joining to form a single bow-to-stern funnel.

12. A boat as in claim 11, including:
    a stabilizer bar mounted to extend laterally relative to said hull above an aft top portion thereof.

13. A boat as in claim 12, including:

means for selectively varying an angle between said hull and said stabilizer bar.

14. A boat as in claim 1, wherein said wings extend downwardly a distance such that when said boat is hydroplaning forwardly upon said fore and aft foil structures, a lowermost tip of each of said wings is substantially tangent to a surface of the water upon which the boat is moving.

* * * * *